US010962070B2

(12) United States Patent
Ketteler et al.

(10) Patent No.: US 10,962,070 B2
(45) Date of Patent: Mar. 30, 2021

(54) BRAKE DISK AND METHOD FOR PRODUCING A BRAKE DISK

(71) Applicants: Robert Bosch GmbH, Stuttgart (DE); Dr. Ing. h.c. F. Porsche Aktiengesellschaft, Stuttgart (DE)

(72) Inventors: Georg Ketteler, Ludwigsburg (DE); Frank Feussner, Wetter (DE); Ilja Potapenko, Biedenkopf (DE); Kangjian Wu, Marburg (DE); Thomas Pfeiffer, Steffenberg (DE); Christoph Oger, Karlsruhe (DE)

(73) Assignees: Robert Bosch GmbH, Stuttgart (DE); Dr. Ing. H.C.F. Porsche, Stuttgart (DE)

( * ) Notice: Subject to any disclaimer, the term of this patent is extended or adjusted under 35 U.S.C. 154(b) by 13 days.

(21) Appl. No.: 16/132,378

(22) Filed: Sep. 15, 2018

(65) Prior Publication Data
US 2019/0085922 A1    Mar. 21, 2019

(30) Foreign Application Priority Data

Sep. 21, 2017 (DE) .......................... 10 2017 216 750
Mar. 14, 2018 (DE) .......................... 10 2018 203 891
Apr. 16, 2018 (DE) .......................... 10 2018 205 697

(51) Int. Cl.
F16D 65/12 (2006.01)
F16D 65/02 (2006.01)

(52) U.S. Cl.
CPC .......... *F16D 65/127* (2013.01); *F16D 65/125* (2013.01); *F16D 65/128* (2013.01);
(Continued)

(58) Field of Classification Search
CPC ...... F16D 65/12; F16D 65/125; F16D 65/127; F16D 65/128; F16D 2065/1316;
(Continued)

(56) References Cited

U.S. PATENT DOCUMENTS 3,753,476 A * 8/1973 Dernovashek ........ F16D 65/121
188/73.2
3,809,192 A * 5/1974 Stehle ................... F16D 65/128
188/218 XL
(Continued)

FOREIGN PATENT DOCUMENTS

DE          198 24 465 A1   12/1999
DE     10 2006 043 415 A1    4/2008
(Continued)

OTHER PUBLICATIONS

Englished machined translation of Description, DE-102011087136 A1), May 29, 2013.*

*Primary Examiner* — Robert A. Siconolfi
*Assistant Examiner* — San M Aung
(74) *Attorney, Agent, or Firm* — Maginot, Moore & Beck LLP

(57) ABSTRACT

A brake disk includes at least one friction ring, which includes a base member. The brake disk also includes at least one hole and/or groove located in the friction ring. The brake disk also includes at least one coating, which is applied to at least portions of the friction ring. The coating comprises at least portions of the transition between the hole and/or
(Continued)

groove and the friction ring. At least portions of the transition between the hole and/or groove and the friction ring are constructed to be rounded and/or chamfered in a flat manner.

11 Claims, 5 Drawing Sheets

(52) U.S. Cl.
CPC ............. *F16D 2065/1328* (2013.01); *F16D 2200/0013* (2013.01); *F16D 2250/0046* (2013.01)

(58) Field of Classification Search
CPC ..... F16D 2065/1328; F16D 2065/1392; F16D 2200/0013; F16D 2250/0046; F16D 2250/0038; F16D 2069/045; F16D 2069/006; F16D 2200/003; F16D 2200/0043; C23D 5/10; C23D 13/00; C23D 5/02; C03C 3/064; C03C 3/089; C03C 4/20; C03C 8/02; C09D 5/084
USPC .................................................. 188/218 XL
See application file for complete search history.

(56) References Cited

U.S. PATENT DOCUMENTS

| 2004/0084261 | A1* | 5/2004 | Burgoon ............. F16D 65/0006 188/218 XL |
| 2009/0026025 | A1* | 1/2009 | Hampton ............. F16D 65/127 188/218 XL |
| 2011/0048871 | A1 | 3/2011 | Meckel |
| 2013/0098717 | A1* | 4/2013 | Hantschke ............. F16D 65/12 188/218 XL |
| 2013/0248304 | A1* | 9/2013 | Lee ......... F16D 65/12 188/218 XL |
| 2014/0116822 | A1* | 5/2014 | Chen ......... F16D 65/12 188/218 XL |
| 2015/0014104 | A1* | 1/2015 | Beer ......... F16D 65/127 188/218 XL |
| 2016/0273601 | A1* | 9/2016 | Broda ......... F16D 65/125 |
| 2016/0348744 | A1* | 12/2016 | Broda ......... C03C 4/20 |

FOREIGN PATENT DOCUMENTS

DE      10 2011 111 837 B3      12/2012
DE      10 2011 087 136 A1      5/2013

* cited by examiner

BRAKE DISK AND METHOD FOR PRODUCING A BRAKE DISK

This application claims priority under 35 U.S.C. § 119 to: patent application number DE 10 2017 216 750.5, filed on 21 Sep. 2017 in Germany; patent application number DE 10 2018 203 891.0, filed on 14 Mar. 2018 in Germany; and patent application number DE 10 2018 205 697.8, filed on 16 Apr. 2018 in Germany, the disclosures of which are incorporated herein by reference in their entireties.

BACKGROUND

The present disclosure relates to a brake disk and a method for producing a brake disk having the features described herein.

Brake disks are intended to transmit the brake torque during a deceleration of the vehicle to the axle and to intermediately store the kinetic energy which occurs during the braking operation temporarily in the form of heat and subsequently to discharge it again via conduction, radiation and convection.

Conventional brake disks are often produced from temperature-resistant grey cast iron. Wear-resistant brake disks are produced either with very expensive full ceramic brake disks being used or by a hard metal layer of tungsten carbide (WC) being sprayed onto a grey cast iron disk by means of an HVOF method. To this end, there is used a WC-based powder which leads to high wear-resistance. Such a brake disk can be derived from DE 10 2011 087 136 A1.

Furthermore, brake disks are partially axially perforated or provided with slots or grooves. Brake abrasion and water which remains on the disk in the event of rain is thus intended to accumulate in the grooves and, as a result of the centrifugal force, to be discharged outward along the groove. Consequently, such measures can improve the response behavior during wet weather. Furthermore, holes can increase the heat discharge in the brake disk.

The wear-resistant brake disks may be produced with perforation holes (drilled through or constructed as blind holes or indentations) or produced with grooves.

The grey cast iron disk additionally has a tendency toward corrosion during operation, for which reason the hard metal layer is implemented by an additional nickel layer as a bonding and corrosion layer. This nickel layer is intended to protrude in the most uniform manner possible and to the greatest possible extent into the perforation hole or groove in order to prevent the sub-corrosion of the layer. This is not the case with the angular construction of the perforation holes or the groove.

SUMMARY

The disclosure is based on a brake disk having at least one friction ring which comprises a base member and at least one hole and/or groove which is located in the friction ring. Furthermore, the brake disk has at least one coating which is applied to at least one portion of the friction ring. In this instance, the coating comprises at least portions of the transition between the hole and/or groove and the friction ring.

The core of the disclosure involves at least portions of the transition between the hole and/or groove and the friction ring being constructed to be rounded and/or chamfered in a flat manner.

A chamfered surface on a workpiece edge is generally referred to as a chamfer. For example, the sharp edges are "broken" by means of a chamfer. Chamfering is in this instance the production of such a chamfer. On holes, for example, a chamfer is produced by means of a countersink.

As a result of the angular construction of the edges, original perforation holes or grooves are unsuitable since at the edges cracks as a result of the higher tension are preferentially formed, which leads to flaking of the layer and consequently to the failure of the brake disk. The disclosure has the advantage that, as a result of the rounded and/or flat-chamfered construction, tensions at the edges and consequently the production of cracks and resultant detachments of layers on the perforation holes or grooves are prevented.

In an advantageous embodiment of the disclosure, there is provision for at least portions of the transition between the hole and/or groove and the friction ring in the base member to be constructed in a rounded manner. This means that not only the coated edges are constructed to be rounded and/or chamfered flat, but instead the rounded portions are also brought about by the coating on the rounded edges of the base member. The production of cracks and consequently the resultant detachments of layers on the edges of the perforation holes or grooves are thereby prevented in a particularly effective manner.

In another advantageous embodiment of the disclosure, the coating is applied directly to the base member whilst, in an alternative embodiment, the coating is applied by means of at least one intermediate layer to the base member.

In a particularly advantageous manner, the base member is of grey cast iron.

The disclosure further also relates to the method for producing a brake disk having at least one friction ring which comprises a base member having the following steps:
 introducing at least one hole and/or groove into the base member, wherein edges are produced in the region of the transition between the hole and/or groove and base member,
 coating at least portions of the base member and the transition directly or by means of at least one intermediate layer.

The central notion of the disclosure involves the edges, in particular of the base member, being at least partially rounded and/or chamfered in a flat manner prior to the coating.

The disclosure has the advantage already mentioned that, as a result of the rounded embodiment, tensions at the edges and consequently the production of cracks and resultant detachments of layers on the perforation holes or grooves are prevented.

Advantageously, the coated base member is ground.

In particular, there is provision for the coating and/or the grinding to be carried out in a uniform manner.

Other advantageous embodiments of the disclosure can be derived from the following description.

BRIEF DESCRIPTION OF THE DRAWINGS

Embodiments of the disclosure are explained below with reference to drawings, in which.

DETAILED DESCRIPTION

Figure 1:
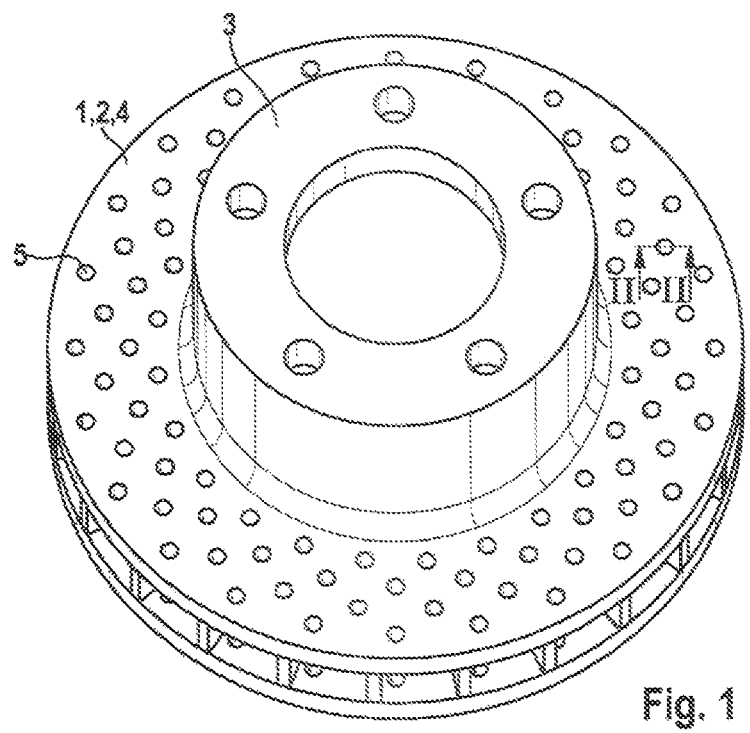
FIG. 1 shows a perforated and coated brake disk according to the prior art.

The brake disk 1 illustrated in FIG. 1 has a circular-ring-disk-like brake ring 2 and a coaxial, bowl-like hub 3 which is integral with the brake ring 2. The friction ring 2 forms the actual brake disk. The brake disk 1 is internally ventilated, the brake ring 2 thereof is dual-walled. Outer end faces of the brake ring 2 form circular-ring-disk-like friction faces 4 of the brake disk 1. The friction faces 4 are the surfaces of the brake disk 1, against which friction brake linings which are not illustrated during braking are pressed in order to brake the brake disk 1 by means of friction. The brake disk 1 is perforated, that is to say, it has holes 5 which extend through the brake ring 2. The brake disk 1 comprises grey cast iron or a steel alloy.

The friction faces 4 of the brake disk 1 are provided with a surface coating which increases a wear resistance and a corrosion resistance. The surface coating may be a thermal powder coating which is applied, for example, by means of flame spraying or arc spraying. The surface coating of the friction faces 4 may have carbides, in particular metal carbides, for example, chromium or tungsten carbides, which are embedded in a matrix, in particular a metal matrix, for example, of nickel or cobalt. The surface coating of the friction faces 4 which increases the wear resistance and corrosion resistance may be single-layered or multi-layered.

Figure 2:
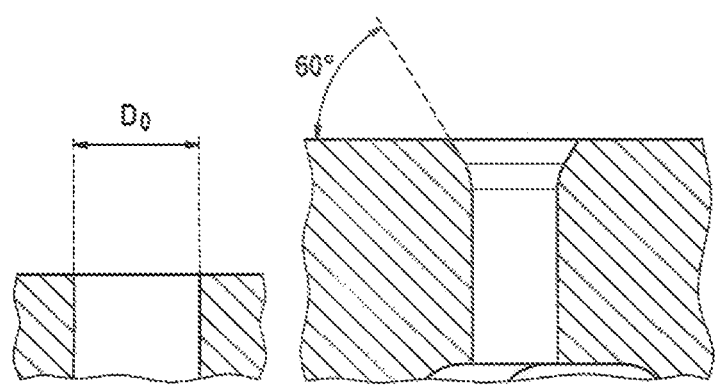
FIG. 2 shows embodiments of the perforation holes of a grey cast iron brake disk according to the prior art.

FIG. 2 shows embodiments of the holes or perforation holes 5 with the diameter $D_0$ of a grey cast iron brake disk (portion indicated with shading) according to the prior art. The holes may in this instance be constructed to be chamfered toward the surface, in FIG. 2, for example, through 60 degrees.

Figure 3:
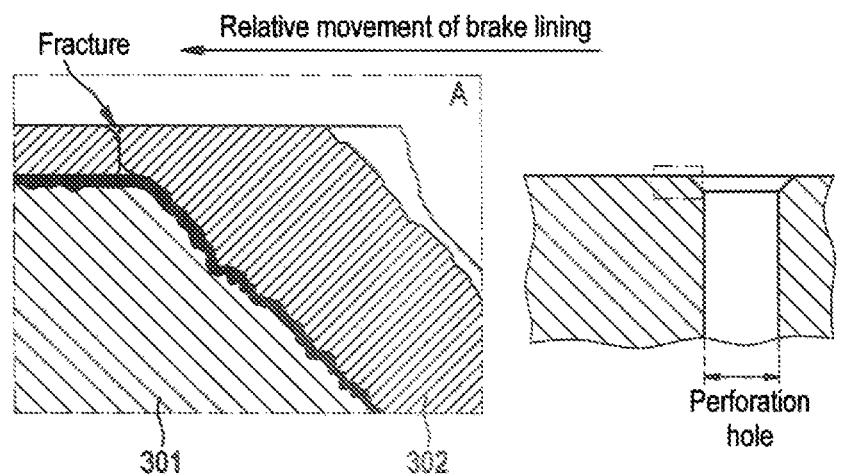
FIGS. 3 and 4 show a brake disk in the region of the perforation holes according to the prior art during transverse grinding after a brake test.
Figure 4:
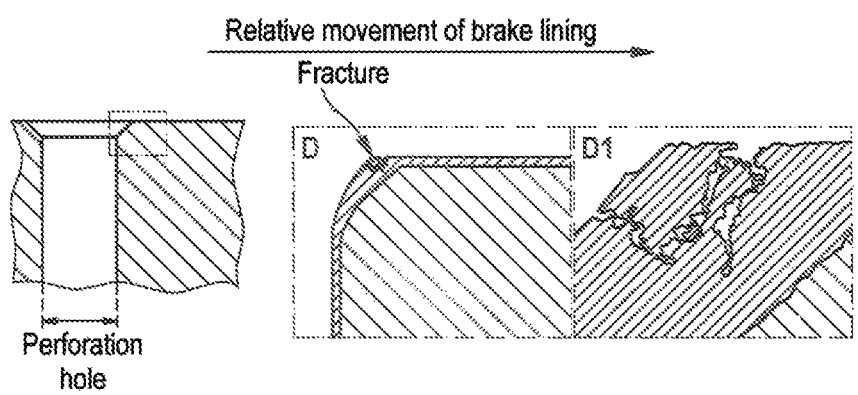

FIGS. 3 and 4 show brake disks in the region of the perforation holes according to FIG. 2 during transverse grinding after a brake test. In the lower portion of the grinding images, it is possible to see the base member 301 of grey cast iron which is provided with a coating 302 illustrated in the upper portion. The arrow indicates in this instance the movement of the brake lining (not illustrated) relative to the brake disk which is illustrated in the Figures in the region of the perforation holes.

It can be seen that the friction between the brake lining and brake disk results in the region of the edges of the perforation holes in cracks and separations of the surface coating.

An object of the present disclosure is to prevent tensions at the edges and consequently production of the cracks and resultant layer detachments in the perforation holes or grooves.

Figure 5:
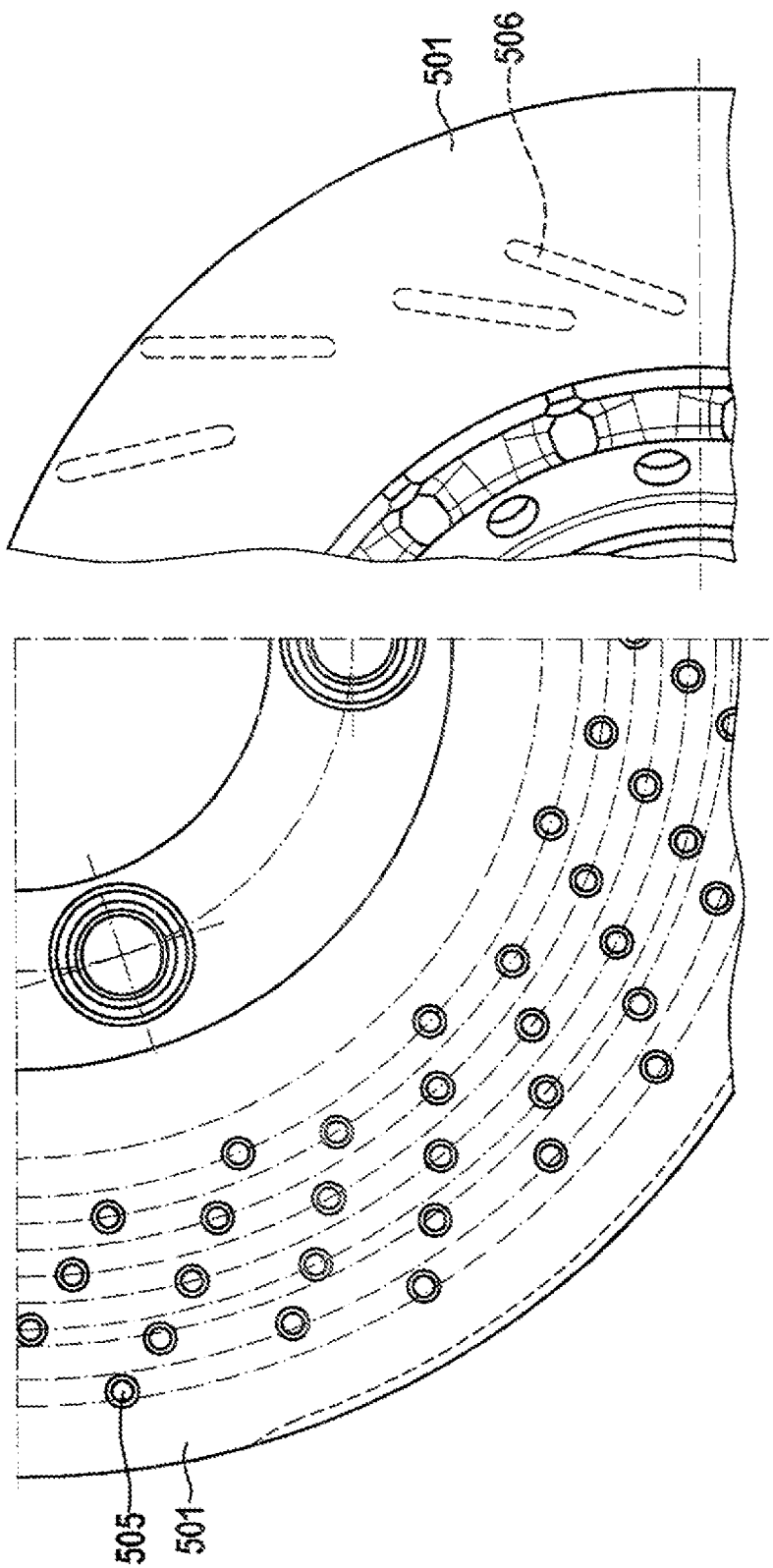
FIG. 5 shows a brake disk with perforation holes and grooves.

FIG. 5 shows a brake disk 501 with perforation holes 505 (left portion) and grooves 506 (right portion).

Figure 6:
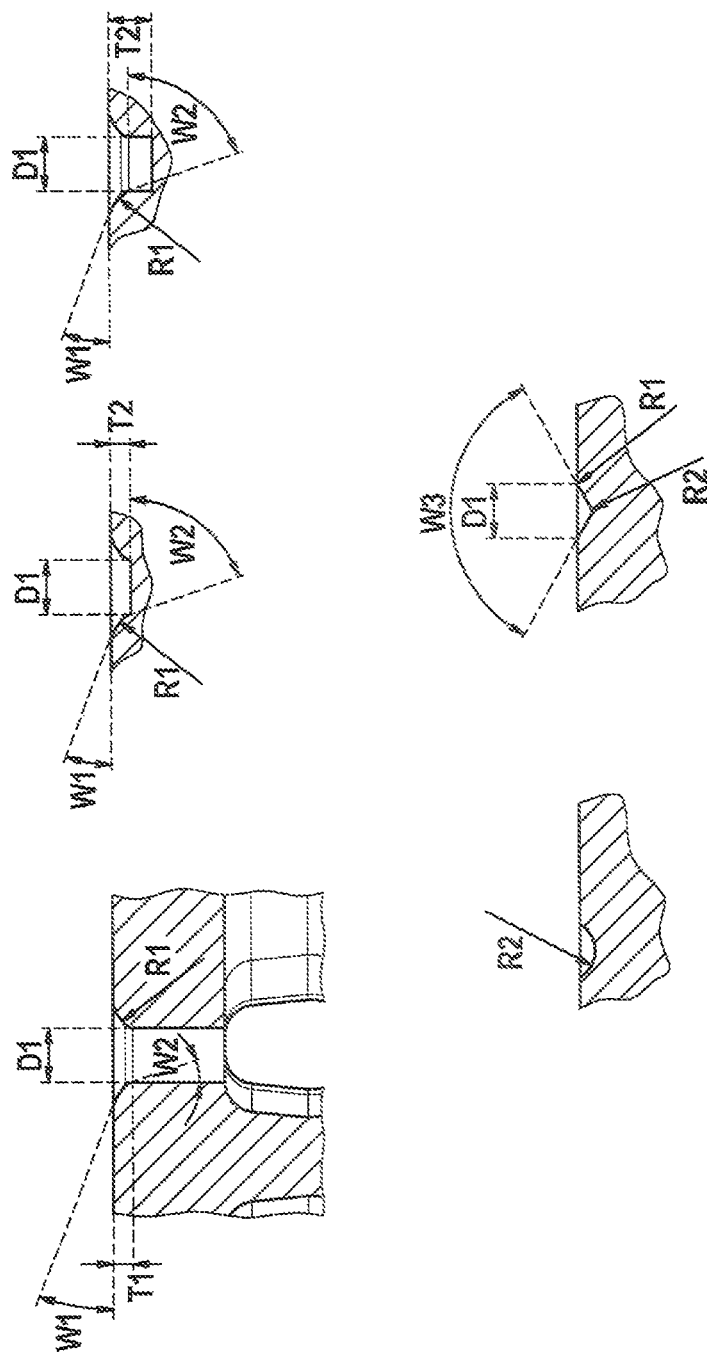
FIG. 6 shows embodiments of the perforation holes and grooves.

FIG. 6 shows embodiments according to the disclosure of the edges of the holes/perforation holes or grooves 5 with the diameter $D_1$ of a grey cast iron brake disk (portion indicated with shading). The edges are now rounded in contrast to the embodiments illustrated in FIG. 2. With the rounded embodiment of the hole geometry or the groove geometry, the tensions in the layer are reduced. The cracks and consequently the layer flaking in the perforation holes are effectively eliminated.

The perforation holes shown in FIG. 6 may be drilled or constructed as grooves as a countersunk geometry. The rounded portions may be constructed by means of drills or milling tools.

Possible values are:

perforation hole diameter or groove width D1: 0.5-15 mm (standard 4 mm)

rounding in the outlet of the hole R1: 0.2-10 mm (standard 1.8 mm)

rounding at the tip of the hole R2: 0.1-10 mm (standard 1.0 mm)

angle on the friction face W1: 1°-30° (standard 15°)

angle in the hole W2: 1°-45° (standard 20°)

angle in the hole W3: 50°-160° (standard 120°)

rounding R1: 0.2-10 mm (standard 1.5 mm)

rounding R2: 0.2-10 mm, depth of the blind holes T2: 0.2 mm to completely drilled through (standard 1.5-3.5 mm)

Figure 7:
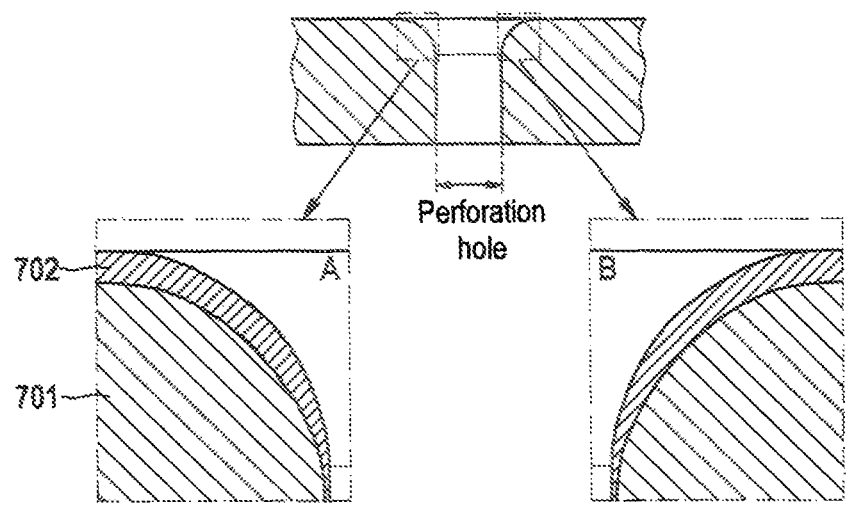
FIG. 7 shows a grinding operation through the perforation hole coated according to the disclosure with a rounding of 1.8 mm.
Figure 8:
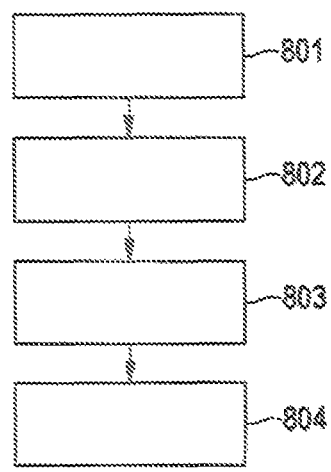
FIG. 8 shows the production method according to the disclosure.

FIG. 7 now shows a grinding through the perforation hole coated according to the disclosure with rounded edges having a rounding of 1.8 mm after a brake test. As in FIGS. 3 and 4, in the lower portion the base member 701 with the rounded edges can be seen. The coating 702 illustrated in the upper portion is then applied to this base member.

In contrast to FIGS. 3 and 4 (no rounded edges), it can be seen in FIG. 7, in which the perforation holes are constructed with rounding on the brake ring surface, that the tension in the coating is reduced and consequently cracks and flaking are prevented.

With reference to the Figures, the method for producing the brake disk according to the disclosure is now intended to be explained.

In step 801, the base member which is constructed in this embodiment as grey cast iron is provided. Subsequently, in step 802, the holes/perforation holes and/or grooves with the rounded edges are introduced into the brake disk. In step 803, where applicable after additional processing steps of the surface of the base member, the wear-resistant coating is then applied in the most uniform manner possible to the surface which is intended to be contacted with the brake lining. An intermediate layer may also be provided between the base member and the wear-resistant coating. Subsequently, in step 804, the coating may further be ground.

What is claimed is:

1. A brake disk, comprising:
   at least one friction ring including a base member;
   at least one blind hole and/or blind groove located in the friction ring; and
   at least one coating applied to at least portions of the at least one friction ring, wherein:
   the coating includes at least portions of a transition between the blind hole and/or blind groove and the at least one friction ring,
   the at least portions of the transition between the blind hole and/or blind groove and the at least one friction ring are constructed in a rounded manner; and
   at least portions of a transition between the blind hole and/or blind groove and the at least one friction ring in the base member are constructed in a rounded manner.

2. The brake disk according to claim 1, wherein the coating is applied directly to the base member.

3. The brake disk according to claim 1, wherein the coating is applied by way of at least one intermediate layer to the base member.

4. The brake disk according to claim 1, wherein the base member is of grey cast iron.

5. A method for producing a brake disk having at least one friction ring which comprises a base member, the method comprising:
   introducing at least one blind hole and/or blind groove into the base member, wherein edges are produced in a region of a transition between the blind hole and/or blind groove and the base member; and
   coating at least portions of the base member and the transition directly or by way of at least one intermediate layer,
   wherein, prior to coating, the edges are at least partially rounded.

6. The method according to claim 5, wherein after rounding, the coating is ground.

7. The method according to claim 6, wherein at least one of coating and grinding is carried out in a uniform manner.

8. The method of claim 5, wherein coating comprises:
   coating at least portions of the base member and the transition directly or by way of at least one intermediate layer with a wear resistant coating.

9. The method of claim 8, wherein coating comprises:
   coating at least portions of the base member and the transition directly with a wear resistant coating.

10. The brake disk of claim 1, wherein the coating is a wear resistant coating.

11. The brake disk according to claim 10, wherein the wear resistant coating is applied directly to the base member.

\* \* \* \* \*